(12) United States Patent
Irwin et al.

(10) Patent No.: US 7,803,457 B2
(45) Date of Patent: Sep. 28, 2010

(54) COMPOSITE COATINGS FOR GROUNDWALL INSULATION, METHOD OF MANUFACTURE THEREOF AND ARTICLES DERIVED THEREFROM

(75) Inventors: Patricia Chapman Irwin, Altamont, NY (US); Luana Emiliana Iorio, Clifton Park, NY (US); George Gao, Round Rock, TX (US); Yang Cao, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 252 days.

(21) Appl. No.: 10/747,725

(22) Filed: Dec. 29, 2003

(65) Prior Publication Data

US 2005/0142349 A1 Jun. 30, 2005

(51) Int. Cl.
*B32B 5/16* (2006.01)
*B32B 15/08* (2006.01)
*B32B 19/02* (2006.01)
*B05D 3/02* (2006.01)
*B05D 5/12* (2006.01)
*B05D 1/02* (2006.01)
*B05D 1/18* (2006.01)
*B05D 1/28* (2006.01)

(52) U.S. Cl. .............. 428/323; 428/324; 428/328; 428/329; 428/330; 428/332; 428/339; 428/447; 427/385.5; 427/427.4; 427/429; 427/430.1; 427/458

(58) Field of Classification Search .................. None
See application file for complete search history.

(56) References Cited

U.S. PATENT DOCUMENTS

| | | | |
|---|---|---|---|
| 2,496,948 A | 2/1950 | Lutz | 524/764 |
| 2,744,839 A | 5/1956 | Radley | 428/329 |
| 2,970,936 A * | 2/1961 | Richardson | 29/596 |
| 3,245,841 A | 4/1966 | Clarke et al. | 428/403 |
| 3,725,521 A | 4/1973 | Ebling | 264/104 |
| 4,025,485 A * | 5/1977 | Kodama et al. | 524/729 |
| 4,043,846 A | 8/1977 | Amemiya et al. | 148/105 |
| 4,116,728 A | 9/1978 | Becker et al. | 148/108 |
| 4,165,232 A | 8/1979 | Jaeckh et al. | 75/349 |
| 4,177,089 A | 12/1979 | Bankson | 148/309 |
| 4,317,001 A * | 2/1982 | Silver et al. | 174/102 SC |
| 4,390,596 A * | 6/1983 | Laurent | 428/473.5 |
| 4,493,873 A * | 1/1985 | Keane et al. | 428/372 |
| 4,601,753 A | 7/1986 | Soileau et al. | 428/404 |
| 4,601,765 A | 7/1986 | Soileau et al. | 148/404 |
| 4,602,957 A | 7/1986 | Pollock et al. | 75/246 |
| 4,919,734 A | 4/1990 | Ochiai et al. | 148/306 |
| 4,927,473 A | 5/1990 | Ochiai et al. | 148/306 |
| 4,947,065 A | 8/1990 | Ward et al. | 310/44 |
| 4,956,011 A | 9/1990 | Nishida et al. | 75/230 |
| 5,063,011 A | 11/1991 | Rutz et al. | 264/126 |
| 5,160,447 A | 11/1992 | Ishikawa et al. | 252/62.54 |
| 5,198,137 A | 3/1993 | Rutz et al. | 252/62.54 |
| 5,252,148 A | 10/1993 | Shigeta et al. | 148/307 |
| 5,256,326 A | 10/1993 | Kawato et al. | 252/62.54 |
| 5,306,524 A | 4/1994 | Rutz et al. | 427/216 |
| 5,350,558 A | 9/1994 | Kawato et al. | 419/35 |
| 5,352,522 A | 10/1994 | Kugimiya et al. | 428/403 |
| 5,543,174 A | 8/1996 | Rutz | 427/213 |
| 5,563,001 A | 10/1996 | Gay | 428/694 R |
| 5,567,746 A | 10/1996 | Gay | 523/220 |
| 5,591,373 A | 1/1997 | Ward et al. | 252/62.54 |
| 5,595,609 A | 1/1997 | Gay | 148/104 |
| 5,629,092 A | 5/1997 | Gay et al. | 428/407 |
| 5,637,402 A | 6/1997 | Gay | 428/403 |
| 5,651,841 A | 7/1997 | Moro et al. | 148/309 |
| 5,723,920 A * | 3/1998 | Markovitz et al. | 310/45 |
| 5,754,936 A | 5/1998 | Jansson | 419/10 |
| 5,767,426 A | 6/1998 | Oliver et al. | 75/246 |
| 5,800,636 A | 9/1998 | Tsukada et al. | 148/306 |
| 5,905,104 A | 5/1999 | Eklund et al. | 523/435 |
| 5,982,073 A | 11/1999 | Lashmore et al. | 310/254 |
| 6,042,949 A | 3/2000 | Lashmore | 428/570 |
| 6,102,980 A | 8/2000 | Endo et al. | 75/252 |
| 6,129,790 A | 10/2000 | Lashmore et al. | 148/307 |
| 6,169,354 B1 | 1/2001 | Springer et al. | 310/268 |
| 6,193,903 B1 | 2/2001 | Gay et al. | 252/62.55 |
| 6,251,514 B1 | 6/2001 | Lashmore et al. | 428/328 |
| 6,261,644 B1 | 7/2001 | Nittel et al. | 427/437 |

(Continued)

FOREIGN PATENT DOCUMENTS

EP 0434669 A2 6/1985

(Continued)

OTHER PUBLICATIONS

Japanese Abstract for JP1263217 Oct. 19, 1989.

(Continued)

*Primary Examiner*—Monique R Jackson
(74) *Attorney, Agent, or Firm*—Andrew J. Caruso (57) ABSTRACT

Disclosed herein is an article comprising an electrical component; and an electrically insulating layer disposed upon the electrical component, wherein the electrically insulating layer comprises a thermosetting polymer and a nanosized filler. Disclosed herein too is a method of manufacturing an article comprising disposing an electrically insulating layer upon an electrical component, wherein the electrically insulating layer comprises a thermosetting polymer and a nanosized filler; and curing the thermosetting polymer.

23 Claims, 7 Drawing Sheets

U.S. PATENT DOCUMENTS

| | | | |
|---|---|---|---|
| 6,309,748 B1 | 10/2001 | Lashmore et al. | 428/403 |
| 6,338,900 B1 | 1/2002 | Tada et al. | 428/402 |
| 6,359,232 B1 * | 3/2002 | Markovitz et al. | 174/209 |
| 6,562,465 B1 * | 5/2003 | Nakashima et al. | 428/412 |
| 6,783,828 B2 * | 8/2004 | Fujimaru et al. | 428/40.1 |
| 6,800,804 B2 * | 10/2004 | Igarashi et al. | 174/35 MS |
| 6,849,926 B2 * | 2/2005 | Park et al. | 257/642 |
| 6,869,683 B2 * | 3/2005 | Sakurai et al. | 428/448 |
| 6,908,960 B2 * | 6/2005 | Takaya et al. | 524/494 |
| 7,041,148 B2 | 5/2006 | Iorio et al. | |
| 2002/0023693 A1 | 2/2002 | Lefebvre et al. | 148/105 |
| 2002/0132898 A1 * | 9/2002 | Takaya et al. | 524/445 |
| 2003/0113461 A1 * | 6/2003 | Ahmed et al. | 427/387 |
| 2004/0084112 A1 | 5/2004 | Verma et al. | |

FOREIGN PATENT DOCUMENTS

| | | |
|---|---|---|
| EP | 0619584 B1 | 10/1994 |
| EP | 0897998 B1 | 7/1998 |
| JP | 06028929 A * | 2/1994 |
| JP | 2002064276 A * | 2/2002 |
| WO | WO99/30901 | 6/1999 |
| WO | WO00/30835 | 6/2000 |

OTHER PUBLICATIONS

Japanese Abstract for JP4352403 Dec. 7, 1992.
Japanese Abstract for JP5036514 Feb. 12, 1993.
Japanese Abstract for JP8167519 Jun. 25, 1996.
Japanese Abstract for JP8013013 Jan. 16, 1996.
Japanese Abstract for JP56155510 Jan. 12, 1981.
Japanese Abstract for JP2001176716 Jun. 29, 2001.
Japanese Abstract for JP62247004 Oct. 28, 1987.
Japanese Abstract for JP62247005 Oct. 28, 1987.
Japanese Abstract for JP3291305 Dec. 20, 1991.
Japanese Abstract for JP06036912 Oct. 2, 1994.
Japanese Abstract for JP06318749 Nov. 15, 1994.
Article Abstract for "Enhanced Sintering of an Fe-Ni-P Coated Composite Powder Prepared by Electroless Nickel Plating" by Chan et al., Journal of Materials Engineering and Performance, Oct. 1997.
S. Pelletier et al. "Effect of Compaction Temperature on Magnetic Properties of Iron-Resin Composites" Industrial Materials Institute/National Research Council Canada, Quebec Metal Powders Limited pp. 20-63-20-75.
Jack et al. "Design and Testing of a Universal Motor Using a Soft Magnetic Composite Stator" The University of Newcastle upon Tyne, UK, 2000 IEEE pp. 46-50.
Vasilyev et al. "Soft Magnetic Materials for Transformers Sintered of Iron Based Powders" Don State Technical University, Rostov-on-Don, 344010, Russia pp. 20-3-20-12.
Moyer et al. "Improvement in Magnetic and Tensile Properties by Coating Iron Powder with Phosphorus" Magna-Tech P/M Labs pp. 1-77-1-88.

* cited by examiner

○ Pure PAI
□ 5% (TS530) SiO$_2$
× 5% coated Al$_2$O$_3$
◇ 3+3% TS530 + Al$_2$O$_3$
● 5+5% TS530 + Al$_2$O$_3$

COMPOSITE COATINGS FOR GROUNDWALL INSULATION, METHOD OF MANUFACTURE THEREOF AND ARTICLES DERIVED THEREFROM

BACKGROUND

This disclosure relates to composite coatings for groundwall insulation in electromagnetic devices such as motors, generators, and the like, methods of manufacture thereof, and articles derived therefrom.

Groundwall insulation for electrical components that are utilized in electrical devices have generally been manufactured from multilayered materials. Multiple layers facilitate a higher resistance to corona discharge. It is also desirable for the insulating layer to have a high value of breakdown voltage so that it can withstand the high voltage environment of electrical devices such as motors and generators. The multiple layers are generally comprised of a fibrous backing manufactured from glass as well as additional layers manufactured from mica. The use of multiple layers is both time-consuming as well as expensive. In addition, the use of multiple layers generally results in a thicker layer of insulation and consequently larger parts.

It is therefore generally desirable to use insulating layers that can be applied in a single step process and that can withstand higher voltages while have reduced thickness when compared with insulation that is made from multilayered materials.

SUMMARY

Disclosed herein is an article comprising an electrical component; and an electrically insulating layer disposed upon the electrical component, wherein the electrically insulating layer comprises a thermosetting polymer and a nanosized filler.

Disclosed herein too is a method of manufacturing an article comprising disposing an electrically insulating layer upon an electrical component, wherein the electrically insulating layer comprises a thermosetting polymer and a nanosized filler; and curing the thermosetting polymer.

Disclosed herein too are electrical devices containing components that used the insulating layer.

DETAILED DESCRIPTION OF PREFERRED EMBODIMENTS

Disclosed herein is an insulating layer that may be used to protect and insulate electrical components of electrical devices such as motors, generators, and the like. Disclosed herein too, is a method for applying the insulating layer on to electrical components that may be utilized in electrical devices. Suitable examples of such electrical components are electrical conduction windings, stator bars, or on the inside of a stator piece, or the like. The insulating layer generally comprises a thermosetting polymer and a nano-sized filler. The nanosized fillers are generally ceramic oxides, mineral fillers and/or clays.

The insulating layer is advantageous in that it can be applied to the electrical components in thicknesses of about 30 to about 300 micrometers, which is generally less than or equal to other commercially available insulating layers. The insulating layer advantageously has a compressive strength and hardness effective to withstand a compressive force of about 250 to about 1000 mega-Pascals (MPa). Application of the insulating layer also provides an opportunity for excluding the tape wound, micaeous and polymeric groundwall insulation or slot liner material that is generally used in electrical devices. The insulating layer can be easily applied in a single step process such as dip coating, spray painting, and the like. It also provides the potential for thinner insulation layers and provides a more robust insulation material because of its ability to withstand higher voltages. It also displays a significant corona resistance compared with other comparative insulating materials that do not contain nanosized fillers. It is to be noted that all ranges disclosed within this specification are inclusive and combinable.

The thermosetting polymer generally comprises a polymer that may be a homopolymer, a copolymer such as a star block copolymer, a graft copolymer, an alternating block copolymer or a random copolymer, ionomer, dendrimer, or a combination comprising at least one of the foregoing polymers that may be covalently crosslinked. Suitable examples of thermosetting polymers are polyurethanes, epoxies, phenolics, silicones, polyacrylics, polycarbonates, polystyrenes, polyesters, polyamides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, or the like, or combinations comprising at least one of the foregoing thermosetting polymers. Blends of thermosetting polymers may also be utilized. The preferred thermosetting polymer is a silicone polymer. The term polymer as used herein is used to mean either a small molecule (e.g., monomer, dimer, trimer, and the like), a homopolymer or a copolymer.

The silicone polymers that may be used in the preparation of the insulating layer generally has the formula (I) prior to reacting to form the thermoset wherein $R_1$, $R_2$, $R_3$, $R_4$, $R_5$ and $R_6$ may be the same or different and wherein at least one of $R_1$, $R_2$, $R_3$, $R_4$, $R_5$ and $R_6$ is a reactive functionality prior to cross linking; m and n can be any integer including 0, with the exception that both m and n cannot be 0 at the same time. In general, while it is preferred for at least one of $R_1$, $R_2$, $R_3$, $R_4$, $R_5$ and $R_6$ to be reactive, it is generally desirable for two or preferably three of $R_1$, $R_2$, $R_3$, $R_4$, $R_5$ or $R_6$ to be chemically reactive. It is generally desirable for the sum of m and n to be about 1 to about 50,000. Suitable examples of groups that may be present as $R_1$, $R_2$, $R_3$, $R_4$, $R_5$ or $R_6$ in the equation (I) are alkyl, aryl, araalkyl, fluoroalkyl, vinylalkyl, aminoalkyl, vinyl, epoxy, hydride, silanol, amine, carbinol (hydroalkyl), methacrylate, acrylate, mercapto, haloalkyl, halogen, carboxylate, acetoxy, alkoxy, or the like. Preferred reactive functional groups are vinyl or epoxy. Preferred non-reactive functional groups are alkyl, fluoroalkyl or phenyl. A preferred silicone polymer is a condensation cure silicone having methyl, phenyl and hydroxyl functional groups. One of the commercially available silicone polymer is MC 550 BKH® commercially available from General Electric Silicones in Waterford, N.Y. MC 550 BKH® contains 78 wt % of a reinforcing agent. The reinforcing agent is not nanosized and comprises fused silica and fiberglass in a weight ratio of 80:20 ratio. Nanosized fillers of interest are then added to this material.

It is generally desirable for the thermosetting polymer to have a number average molecular weight of about 75 to about 500,000 grams/mole (g/mole) prior to reacting to form the thermosetting polymer. In one embodiment, it is generally desirable for the thermosetting polymer to have a number average molecular weight of about 150 to about 100,000 g/mole prior to reacting to form the thermosetting polymer. In another embodiment, it is generally desirable for the thermosetting polymer to have a number average molecular weight of about 300 to about 75,000 g/mole prior to reacting to form the thermosetting polymer. In yet another embodiment, it is generally desirable for the thermosetting polymer to have a number average molecular weight of about 450 to about 50,000 g/mole prior to reacting to form the thermosetting polymer. The preferred number average molecular weight of the thermosetting polymer is about 75 to about 5,000 g/mole prior to reacting to form the thermosetting polymer.

It is generally desirable to use the thermosetting polymer in an amount of about 1 to 50 wt %, based on the total weight of the insulating layer. In one embodiment, it is desirable to use the silicone polymer in an amount of about 5 to about 40 wt %, based on the total weight of the insulating layer. In another embodiment, it is desirable to use the silicone polymer in an amount of about 10 to about 30 wt %, based on the total weight of the insulating layer. In yet another embodiment, it is desirable to use the silicone polymer in an amount of about 12 to about 25 wt %, based on the total weight of the insulating layer.

The thermosetting polymer may optionally be mixed with reactive precursors such as silanes in order to increase the crosslink density. Suitable silanes are chlorosilanes, vinylsilanes, vinylalkoxysilanes, aklylacetoxysilanes, and the like. Chlorosilanes are preferred. Suitable examples of chlorosilanes are methyltrichlorosilane and dimethyldichlorosilane. It is generally desirable for the dimethyldichlorosilane to have about 1 to about 35 mole percent of hydroxyl groups. In one embodiment, it is desirable for the dimethyldichlorosilane to have about 2 to about 15 mole percent of hydroxyl groups. In one embodiment, it is desirable for the dimethyldichlorosilane to have about 4 to about 8 mole percent of hydroxyl groups.

It is generally desirable to use the thermosetting polymer in an amount of about 50 to about 98 wt %, based on the total weight of the insulating layer. In one embodiment, it is desirable to use the silicone polymer in an amount of about 5 to about 40 wt %, based on the total weight of the insulating layer. In another embodiment, it is desirable to use the silicone polymer in an amount of about 10 to about 30 wt %, based on the total weight of the insulating layer. In yet another embodiment, it is desirable to use the silicone polymer in an amount of about 12 to about 25 wt %, based on the total weight of the insulating layer.

The insulating layer may optionally contain a reinforcing agent that is not nanosized. The reinforcing agent is preferably a filler having particle dimensions of greater than or equal to about 500 nanometers (nm). Suitable reinforcing agents are silica powder, such as fused silica, crystalline silica, natural silica sand, and various silane-coated silicas; talc, including fibrous, modular, needle shaped, and lamellar talcs; glass spheres, both hollow and solid, and surface-treated glass spheres; kaolin, including hard, soft, and calcined kaolin; mica, including metallized mica and mica surface treated with aminosilanes, acryloylsilanes, hexamethylenedisilazane, or coatings having a chemical composition similar to the thermosetting polymer so as to impart good physicals to compounded blends; feldspar and nepheline syenite; silicate spheres; cenospheres; fillite; aluminosilicate (armospheres), including silanized and metallized aluminosilicate; quartz; quartzite; perlite; Tripoli; diatomaceous earth; silicon carbide; molybdenum sulfide; zinc sulfide; aluminum silicate (mullite); synthetic calcium silicate; zirconium silicate; barium titanate; barium ferrite; barium sulfate and heavy spar; flaked fillers and reinforcements such as glass flakes, flaked silicon carbide, aluminum diboride; processed mineral fibers such as those derived from blends comprising at least one of aluminum silicates, aluminum oxides, magnesium oxides, and calcium sulfate hemihydrate; synthetic reinforcing fibers, including polyester fibers such as polyethylene terephthalate fibers, polyvinylalcohol fibers, aromatic polyamide fibers, polybenzimidazole fibers, polyimide fibers, polyphenylene sulfide fibers, polyether ether ketone fibers, boron fibers, ceramic fibers such as silicon carbide, fibers from mixed oxides of aluminum, boron and silicon; single crystal fibers or "whiskers" including silicon carbide fibers, alumina fibers, boron carbide fibers, glass fibers, including textile glass fibers such as E, A, C, ECR, R, S, D, and NE glasses, fiber glass and quartz; or the like, or a combination comprising at least one of the foregoing reinforcing agents.

Preferred reinforcing agents are fused silica and fiber glass. It is generally desirable for the ratio of fused silica to fiber glass is about 1:5 to about 10:1. In one embodiment, the ratio of fused silica to fiber glass is about 1:3 to about 8:1. In another embodiment, the ratio of fused silica to fiber glass is about 1:1 to about 6:1. An exemplary weight ratio of fused silica to fiber glass is about 4:1.

When present, the reinforcing agent may be used in amounts of about 20 to about 90 wt %, based on the total weight of the insulating layer. In one embodiment, it is desirable for the reinforcing agent may be used in amounts of about 30 to about 85 wt %, based on the total weight of the insulating layer. In another embodiment, it is desirable for the reinforcing agent may be used in amounts of about 50 to about 80 wt %, based on the total weight of the insulating layer. An exemplary amount of reinforcing agent is about 78 wt %, based on the total weight of the insulating layer.

As stated above, the insulating layer comprises nanosized fillers. The nanosized fillers are those having an average largest dimension of at least one characteristic length of the particle being less than or equal to about 200 nm. A characteristic length may be a diameter, edge of a face, length, or the like. These nanosized fillers may be ceramic oxides or mineral fillers or nanoclays. The nanosized fillers may have shapes whose dimensionalities are defined by integers, e.g., the particles are either 1, 2 or 3-dimensional in shape. They may also have shapes whose dimensionalities are not defined by integers (e.g., they may exist in the form of fractals). The nanosized fillers may exist in the form of spheres, flakes, fibers, whiskers, or the like, or combinations comprising at least one of the foregoing forms. These fillers may have cross-sectional geometries that may be circular, ellipsoidal, triangular, rectangular, polygonal, or combinations comprising at least one of the foregoing geometries. The fillers, as commercially available, may exist in the form of aggregates or agglomerates prior to incorporation into the insulating layer or even after incorporation into the insulating layer. An aggregate comprises more than one filler particle in physical contact with one another, while an agglomerate comprises more than one aggregate in physical contact with one another.

The nanosized fillers generally comprise nanosized metal oxides. Nanosized metal oxides that may be used in the insulating layer are metal oxides of alkali earth metals, alkaline earth metals, transition metals and other commonly used metals. Suitable examples of metal oxides are calcium oxide, cerium oxide, magnesium oxide, titanium oxide, zinc oxide, silicon oxide, copper oxide, aluminum oxide (e.g., alumina and/or fumed alumina), silicon dioxide (e.g., silica and/or fumed silica), or the like, or combinations comprising at least one of the foregoing metal oxides. Nanosized metal carbides such as silicon carbide, titanium carbide, tungsten carbide, iron carbide, or the like, or combinations comprising at least one of the foregoing metal carbides may also be used in the insulating layer. Preferred metal oxides are fumed alumina, alumina, fumed silica, silica and combinations comprising at least one of the foregoing metal oxides.

The metal oxides and carbides are generally particles having surface areas in an amount of about 1 to about 1000 square meter/gram ($m^2/g$). Within this range it is generally desirable for the metal oxides and carbides to have surface areas greater than or equal to about 5 $m^2/g$, preferably greater than or equal to about 10 $m^2/g$, and more preferably greater than or equal to about 15 $m^2/g$. Also desirable within this range is a surface area less than or equal to about 950 $m^2/g$, preferably less than or equal to about 900 $m^2/g$, and more preferably less than or equal to about 875 $m^2/g$.

It is generally desirable for the nanosized metal oxide and carbide particles to have bulk densities in an amount of about 0.2 to about 2.5 grams per cubic centimeter; true densities in an amount of about 3 to about 7 grams per cubic centimeter and an average pore diameter of about 10 to about 250 angstroms.

Commercially available examples of nanosized metal oxides are NANOACTIVE™ calcium oxide, NANOACTIVE™ calcium oxide plus, NANOACTIVE™ cerium oxide, NANOACTIVE™ magnesium oxide, NANOACTIVE™ magnesium oxide plus, NANOACTIVE™ titanium oxide, NANOACTIVE™ zinc oxide, NANOACTIVE™ silicon oxide, NANOACTIVE™ copper oxide, NANOACTIVE™ aluminum oxide, NANOACTIVE™ aluminum oxide plus, all commercially available from NanoScale Materials Incorporated. Commercially available examples of nanosized metal carbides are titanium carbonitride, silicon carbide, silicon carbide-silicon nitride, and tungsten carbide all commercially available from Pred Materials International Incorporated.

A preferred type of nanosized fillers are the ferritic nanosized particles represented by the formula (II):

$$(MeO)_x \cdot (Fe_2O_3)_{100-x} \qquad (II)$$

where "MeO" is any divalent ferrite forming metal oxide or combinations comprising two or more divalent metal oxides, and "x" is less than 50 mole percent. Suitable examples of ferrite forming divalent metal oxides are iron oxide (FeO), manganese oxide (MnO), nickel oxide (NiO), copper oxide (CuO), zinc oxide (ZnO), cobalt oxide (CoO), magnesium oxide (MgO), calcium oxide (CaO), ceria ($Ce_2O_3$), or the like. Single metal oxides, multi-metal oxides, doped oxides are also envisioned for use in the insulating layer.

Suitable examples of commercially available ferrite forming metal oxides are zinc oxide having average largest dimensions of 30 nm and 80 nm. All of the foregoing commercially available ferrite forming metal oxides may be obtained from Advanced Powder Technology based in St. Welshpool in Australia.

Other examples of commercially available metal oxides are ceria having a particle size of less than or equal to about 20 nm; gadolinium doped ceria having particle sizes of less than or equal to about 20 nm; samarium doped ceria having particle sizes of less than or equal to about 20 nm; or the like, or a combination comprising at least one of the foregoing commercially available metal oxides. All of the foregoing commercially available ferrite forming metal oxides comprising ceria may be obtained from Microcoating Technologies based in Atlanta, Ga.

A suitable example of a commercially available ferritic nanosized fillers is $Ni_{0.5}Zn_{0.5}Fe_2O_4$ manufactured and sold by NanoProducts, Inc. The crystallite size for the $Ni_{0.5}Zn_{0.5}Fe_2O_4$ is 12 nm, specific surface area is 45 square meter/gram ($m^2/g$) and the equivalent spherical diameter is 47 nm.

When ferritic nanosized fillers are used, they may be used in amounts of about 2 to about 15 wt %, based on the total weight of the insulating layer. In one embodiment, the ferritic nanosized fillers are used in amounts of about 3 to about 12 wt %, based on the total weight of the insulating layer. In another embodiment, the ferritic nanosized fillers are used in amounts of about 4 to about 12 wt %, based on the total weight of the insulating layer. In an exemplary embodiment, the ferritic nanosized fillers are used in amounts of about 5 wt %, based on the total weight of the insulating layer.

Suitable examples of other nanosized fillers are mineral fillers such as asbestos, ground glass, kaolin and other clay minerals, silica, calcium silicate, calcium carbonate (whiting), magnesium oxide, zinc oxide, aluminum silicate, calcium sulfate, magnesium carbonate, sodium silicate, barium carbonate, barium sulfate (barytes), mica, talc, alumina trihydrate, quartz, and wollastonite (calcium silicate). Mica is a preferred nanosized mineral filler.

Mica generally comprises phlogopite ($KMg_3AlSi_3O_{10}(OH)_2$) or muscovite ($K_2Al_4[Si_6Al_2O_{20}](OH, F)_4$). This mica (i.e., phlogopite or muscovite or both) is subjected to a process in which it is heated to an elevated temperature of about 500 to about 850° C. This heat causes the mica crystal to partially dehydrate and release a portion of the water, which is bonded naturally in the crystal. When this occurs, the mica partially exfoliates, resulting in smaller particles. The mica is then ground to produce small nanosized filler particles. A suitable from of commercially available mica is mica dust from vonroll Isola.

Nanosized fillers such as nanoclays (nanosized clays) may also be used in the insulating layer. Nanoclays are generally plate-like materials, the clay mineral being generally selected from smectite, vermiculite and halloysite clays. The smectite clay in turn can be selected from montmorillonite, saponite, beidellite, nontrite, hectorite or the like, or combinations comprising at least one of the foregoing clays. A preferred clay mineral is the montmorillonite clay, a layered aluminosilicate. The nanoclay platelets generally have a thickness of about 3 to about 3000 angstroms and a size in the planar direction ranging of about 0.01 to about 100 micrometers. The aspect ratio of the nanoclays is generally of the order of about 10 to about 10,000. The respective clay platelets are separated by a gallery, i.e., a space between parallel layers of clay platelets containing various ions holding the platelets together. One such material is CLOISITE® 10A commercially available from Southern Clay Products, its platelets having a thickness of about 0.001 micrometers (10 angstroms) and a size in the planar direction of about 0.15 to about 0.20 micrometers.

In one embodiment, a combination of metal oxide nanosized fillers and mineral and/or nanoclays may be used in the insulating layer. When such a combination is used, the metal oxide nanosized fillers may be used in an amount of about 1 to about 80 wt %, based on the total weight of the nanosized fillers. In one embodiment, the metal oxide nanosized fillers may be used in an amount of about 2 to about 75 wt %, based on the total weight of the nanosized fillers. In another embodiment, the metal oxide nanosized fillers may be used in an amount of about 3 to about 70 wt %, based on the total weight of the nanosized fillers. A preferred insulating layer is one having metal oxide nanosized fillers in an amount of about 5 wt %, based upon the total weight of the insulating layer. Another preferred insulating layer is one having mica dust in an amount of about 20 wt %, based upon the total weight of the insulating layer.

In one embodiment, it may be desirable to add nanosized fillers of a particular chemical composition to the insulating layer along with micrometer sized fillers of the same chemical composition. In general, the micrometer sized fillers have average largest dimensions of greater than or equal to about 500 nm. For example mica dust having nanosized particle of an average largest dimension of less than or equal to about 200 nm may be added to the insulating layer in conjunction with micrometer sized mica dust having an average particle sizes of about 50 micrometers.

In general when nanosized fillers are used in conjunction with micrometer sized fillers having the same chemical composition, it is generally desirable for the nanosized filler to constitute up to about 50 wt %, more preferably up to about 60 wt %, and even more preferably up to about 70 wt %, based on the total weight of combination of nanosized and micrometer sized fillers.

As stated above, there is no particular limitation to the shape of the nanosized fillers, which may be for example, spherical, irregular, plate-like or whisker like. The nanosized fillers may generally have average largest dimensions of at least one characteristic length being less than or equal to about 200 nm. In one embodiment, the nanosized fillers may have average largest dimensions of less than or equal to about 150 nm. In another embodiment, the nanosized fillers may have average largest dimensions of less than or equal to about 100 nm. In yet another embodiment, the nanosized fillers may have average largest dimensions of less than or equal to about 75 nm. In yet another embodiment, the nanosized fillers may have average largest dimensions of less than or equal to about 50 mm.

As stated above, the nanosized fillers may generally have average largest dimensions of less than or equal to about 200 nm. In one embodiment, more than 90% of the nanosized fillers have average largest dimensions less than or equal to about 200 nm. In another embodiment, more than 95% of the nanosized fillers have average largest dimensions less than or equal to about 200 nm. In yet another embodiment, more than 99% of the nanosized fillers have average largest dimensions less than or equal to about 200 nm. Bimodal or higher particle size distributions may also be used.

The nanosized filler particles may be used in amounts of about 0.01 to about 30 wt % based on the total weight of the insulating layer. In one embodiment, the nanosized filler particles may be used in amounts of about 1 to about 27 wt % based on the total weight of the insulating layer. In another embodiment, the nanosized filler particles may be used in amounts of about 2 to about 24 wt % based on the total weight of the insulating layer. In yet another embodiment, the nanosized filler particles may be used in amounts of about 3 to about 22 wt % based on the total weight of the insulating layer. In an exemplary embodiment, the nanosized filler particles may be used in an amount of about 20 wt % based on the total weight of the insulating layer.

In one embodiment, the nanosized fillers may be coated with a silane-coupling agent to facilitate bonding with the thermosetting polymer. It is generally desirable for the fillers utilized in the curable polymeric resin coating to be treated with a silane-coupling agent such as tetramethylchlorosilane, hexadimethylenedisilazane, gamma-aminopropoxysilane, or the like, or combinations comprising at least one of the foregoing silane coupling agents. The silane-coupling agents generally enhance compatibility of the nanosized filler with the thermosetting polymer and improve the mechanical properties of the insulating layer.

Solvents may optionally be used in the insulating layer. The solvent may be used as a viscosity modifier, or to facilitate the dispersion and/or suspension of nanosized filler. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or combinations comprising at least one of the foregoing solvents are generally desirable. Polar protic solvents such as, but not limited to, water, methanol, acetonitrile, nitromethane, ethanol, propanol, isopropanol, butanol, or the like, or combinations comprising at least one of the foregoing polar protic solvents may be used. Other non-polar solvents such a benzene, toluene, methylene chloride, carbon tetrachloride, hexane, diethyl ether, tetrahydrofuran, or the like, or combinations comprising at least one of the foregoing solvents may also be used. Co-solvents comprising at least one aprotic polar solvent and at least one non-polar solvent may also be utilized. A preferred solvent is xylene or N-methylpyrrolidone.

If a solvent is used, it may be utilized in an amount of about 1 to about 50 wt %, of the total weight of the insulating layer. In one embodiment, if a solvent is used, it may be utilized in an amount of about 3 to about 30 wt %, of the total weight of the insulating layer. In yet another embodiment, if a solvent is used, it may be utilized in an amount of about 5 to about 20 wt %, of the total weight of the insulating layer. It is generally desirable to evaporate the solvent before, during and/or after the curing of the thermosetting polymer.

In one method of manufacturing the insulating layer, the thermosetting polymer is blended with the nanosized filler under high levels of shear in order to facilitate mixing. The level of shear imparted to the mixture of the thermosetting polymer and the nanosized filler is effective to facilitate suspension of the filler in the thermosetting polymer. The energy imparted during the shearing process is about 0.001 kilowatt-hour/kilogram (kWhr/kg) to about 10 kWhr/kg. In one embodiment, the energy imparted during the shearing process is about 0.01 to about 8 kWhr/kg. In another embodiment, the energy imparted during the shearing process is about 0.1 to about 6 kWhr/kg. In yet another embodiment, the energy imparted during the shearing process is about 0.5 to about 4 kWhr/kg.

The shear may be imparted in a melt blending process or it may be imparted via other means such as the application of ultrasonic energy to the mixture. Suitable examples of melt blending equipment are extruders such as single screw extruders, twin screw extruders, or the like; buss kneaders, roll mills, paint mills, helicones, Waring blenders, Henschel mixers, Banbury's, or the like, or a combination comprising at least one of the foregoing melt blenders. Ultrasonic blending may also be carried out to facilitate the suspension and/or dispersion of the nanosized filler in the thermosetting polymer. In order to facilitate the suspension of the nanosized filler, it is desirable that both aggregates and agglomerates are broken in to smaller particles.

As stated above, the insulating layer is disposed upon a electrical components such as electrical conduction windings or stator bars or on the inside of a stator piece, following which it is subjected to curing. An initiator and/or crosslinking catalyst may be added to the mixture of the thermosetting polymer and the nanosized filler prior to or during the disposition of the insulating layer upon the winding. The insulating layer may be applied to the winding via dip coating, spray painting, electrostatic painting, brush painting, spin coating, injection molding, or the like, or a combination comprising at least one of the foregoing processes.

In one embodiment, the insulating layer may be disposed upon a electrical components such as electrical conduction windings or stator bars or on the inside of a stator piece in several steps. For example, an insulating layer of a certain thickness may be disposed upon the electrical components in a first step, while a second insulating layer of another thickness is disposed upon the first layer in a second step. In one embodiment, the first insulating layer may have a different composition from the second insulating layer. The insulating layers may then be subjected to a heat treatment or to electromagnetic radiation such as UV curing and/or microwave curing to facilitate a more effective crosslinking.

In one embodiment, the thermosetting polymer in the insulating layer may be subjected to curing at a temperature of about 100° C. to about 250° C. In another embodiment, the insulating layer may be cured at a temperature of about 120° C. to about 220° C. In yet another embodiment, the insulating layer may be cured at a temperature of about 140° C. to about 200° C. In an exemplary embodiment, the insulating layer may be cured at a temperature of about 180° C.

It is generally desirable to have an insulating layer having a thickness of about 25 to about 300 micrometers ($\mu m$). In one embodiment, it is desirable for the insulating layer to have a thickness of about 30 to about 275 $\mu m$. In another embodiment, it is desirable for the insulating layer to have a thickness of about 40 to about 250 $\mu m$. In yet another embodiment, it is desirable for the insulating layer to have a thickness of about 50 to about 225 $\mu m$.

The insulating layer is advantageous in that it has a breakdown voltage of greater than or equal to about 0.75 kilovolt (kV), specifically greater than or equal to about 1 kV, at a thickness of about 25 to about 300 $\mu m$. In one embodiment, the breakdown voltage for the insulating layer is greater than or equal to about 2 kV. In yet another embodiment, the breakdown voltage for the insulating layer is greater than or equal to about 3 kV. In yet another embodiment, the breakdown voltage for the insulating layer is greater than or equal to about 4 kV.

The insulating layer is advantageous in that it can be applied to the electrical components in thicknesses of about 30 to about 300 micrometers, which is generally less than or equal to other commercially available insulating layers. The insulating layer advantageously has a compressive strength and hardness effective to withstand a compressive force of about 250 to about 1000 mega-Pascals (MPa). Application of the insulating layer also provides an opportunity for excluding the tape wound micaeous combined with polymeric groundwall insulation or slot liner material that is generally used in electrical devices.

The following examples, which are meant to be exemplary, not limiting, illustrate compositions and methods of manufacturing of some of the various embodiments of the insulating layer and articles described herein.

EXAMPLES

Example 1

This example illustrates the effectiveness of the insulating layer when applied to a copper substrate. Two nanosized particles were used. The nanosized particles were nanoferrite particles and nanomica particles having average particle sizes of less than 50 nanometers. The ferritic nanosized filler is $Ni_{0.5}Zn_{0.5}Fe_2O_4$ manufactured and sold by NanoProducts, Inc. The thermosetting polymer was MC 550 BKH commercially available from General Electric Silicones. The weight percent of the silicone polymer in the thermosetting polymer was 22 wt %. The MC 550 contains 78 wt % of a reinforcing agent comprising fused silica to fiber glass in a 4:1 ratio. The composition for the insulating layer is as shown in Table 1.

TABLE 1

| Sample # | Thermosetting polymer (wt %) | Nanosized filler (wt %) |
|---|---|---|
| 1 | MC 550 (80 wt %) | mica (20 wt %) |
| 2 | MC 550 (95 wt %) | ferrite (5 wt %) |
| 3 | MC550 (90 wt %) | mica (10 wt %) |
| 4 | MC550 (100 wt %) | — |

The compositions were prepared by dissolving the MC 550 BKH in xylene at a ratio of 1:1. The nanosized fillers (e.g., ferrite or mica) was then added with stirring. After mechanically mixing the materials, the solution was then sonicated for at least 30 minutes at a maximum amplitude for the volume of material used. A 750 Watt sonicator was used. After sonication, a metallic coupon was coated with the thermosetting polymer from 1 to 4 times to build up various coating thicknesses. Each coating was allowed to dry for 30 minutes before the next coat was added. The coupons were then placed in an oven at 180° C. for 30 minutes. The materials were then tested for electrical breakdown, needle impact and mandrel bend. The needle used was a "phonograph type" needle with an approximate 20 radius at the tip. The mandrel was a conical mandrel with a radius of 3.4 mm to 21 mm. In order to determine the breakdown voltage, the testing was conducted at rate of voltage increase of 500 (alternating current) Volts/second to failure. Evaluation of the materials after heat treatment under inert atmosphere were also conducted. The samples were placed in a cold oven with an argon blanket of 40 cubic feet per minute (cfm). The oven was heated to 350° C. at a rate of 230° C./hour. The oven was maintained at 350° C. for 30 minutes then allowed to cool overnight under the inert atmosphere. The samples were evaluated for film continuity using 5 kV voltage. Pinholes were considered examples of sample failures.

The samples were prepared using various substrates, such as glass, copper, and the results noted in Table 2 are those for insulating layers applied to copper only. As may be seen in the Table 2, several layers were added to the copper substrate. The total insulating layer thickness is also shown in the Table 2.

TABLE 2

|  | # layers | Mean Breakdown Voltage (kVAC) | Insulating Layer Thickness (mils) | Needle Impact (in-lbs) | Mandrel Bend Radius, (mm) |
|---|---|---|---|---|---|
| no nanosized filler | 1 | 0.64 | 0.8 | <250 | 4 |
|  | 2 | 0.69 | 1.2 | <250 | 5 |
|  | 3 | 0.75 | 1.5 | 250 | 6.5 |
|  | 4 | 0.86 | 2 | 250 | >20 |
| 5 wt % ferrite | 1 | 0.63 | 1.5 | <250 | 10.4 |
|  | 2 | 0.79 | 4 | <250 | >20 |
|  | 3 | 0.83 | 5.5 | <250 | >20 |
|  | 4 | 0.9 | 8.2 | <250 | >20 |
| 10 wt % mica | 1 | 0.62 | 1.5 | <250 | 4 |
|  | 2 | 0.8 | 2.2 | <250 | 4.3 |
|  | 3 | 0.74 | 4.8 | 250 | >20 |
|  | 4 | 1.09 | 7 | 500 | >20 |
| 20 wt % mica | 1 | 0.64 | 2.9 | <250 | 4.8 |
|  | 2 | 1.66 | 10.1 | <250 | >20 |
|  | 3 | 1.6 | 11.5 | 250 | >20 |
|  | 4 | 1.3 | 11.9 | 500 | >20 |

From the Table 2, it may be seen that the insulation layers having the higher filler content generally show a higher breakdown strength, which is generally desired.

Example 2

In this example, a polyamideimide (PAI) was used as the thermosetting polymer. The nanosized fillers were fumed alumina, fumed silica, titania and zinc oxide of blends of the foregoing fillers. The fumed alumina and the fumed silica were obtained from NanoProducts Inc. The respective filler compositions are shown in Table 3.

TABLE 3

| Filler type (wt %) |
|---|
| Silica (5 wt %) |
| Silica (10 wt %) |
| HMDZ treated Silica (5 wt %) |
| Alumina (5 wt %) |
| Silica (5 wt %) + Alumina (5 wt %) |
| Silica (3 wt %) + Alumina (3 wt %) |
| PAI coated Alumina (5 wt %) |
| PAI coated Alumina (10 wt %) |
| Zinc Oxide (ZnO) (5 wt %) |
| Titanium dioxide ($TiO_2$) (5 wt %) |

All the nanosized fillers have an average particle size of less than or equal to about 50 nm. The nanosized fillers were either coated with a reactive coating of hexamethylenedisilazane (HMDZ) or with the polyamideimide. In coating the nanosized fillers with the polyamideimide, the nanosized fillers were first coated with a solution of polyamic acid and N-methylpyrrolidone (NMP). The polyamic acid was present in an amount of 27 wt %, based on the weight of the polyamic acid and the NMP. The nanoparticles were coated with PAI by mixing the particles in a solution of PAI in NMP under an inert atmosphere. With high shear mixing, the solution was allowed to slowly come to reflux and kept at reflux for 4 hours (at approximately 190° C.). After cooling overnight the solution was roto-vaporized to remove excess solvent. The resulting solution was then sonicated for 30 minutes to breakup agglomerates before being used for the next step.

The respective fillers shown in the Table 3 were then blended with additional polyamic acid. Sonication was then done here again starting with a 27% solids solution of polyamic acid and sonicating for 2-30 minutes to break up agglomerates. The polyamic acid containing the respective fillers was then cast and cured to form a film. The film was then subjected to corona discharge experiments wherein each film of the cured polyamideimide containing the nanosized fillers was placed between electrodes and subjected to a corona discharge. The corona discharge was generated by utilizing an alternating current voltage of 5000 Volts at a frequency of 3 kilohertz (kHz) between the electrodes. Two pairs of electrodes were used. The first pair of electrodes were needle shaped electrodes while the second pair were curved surface electrodes.

Figure 1:
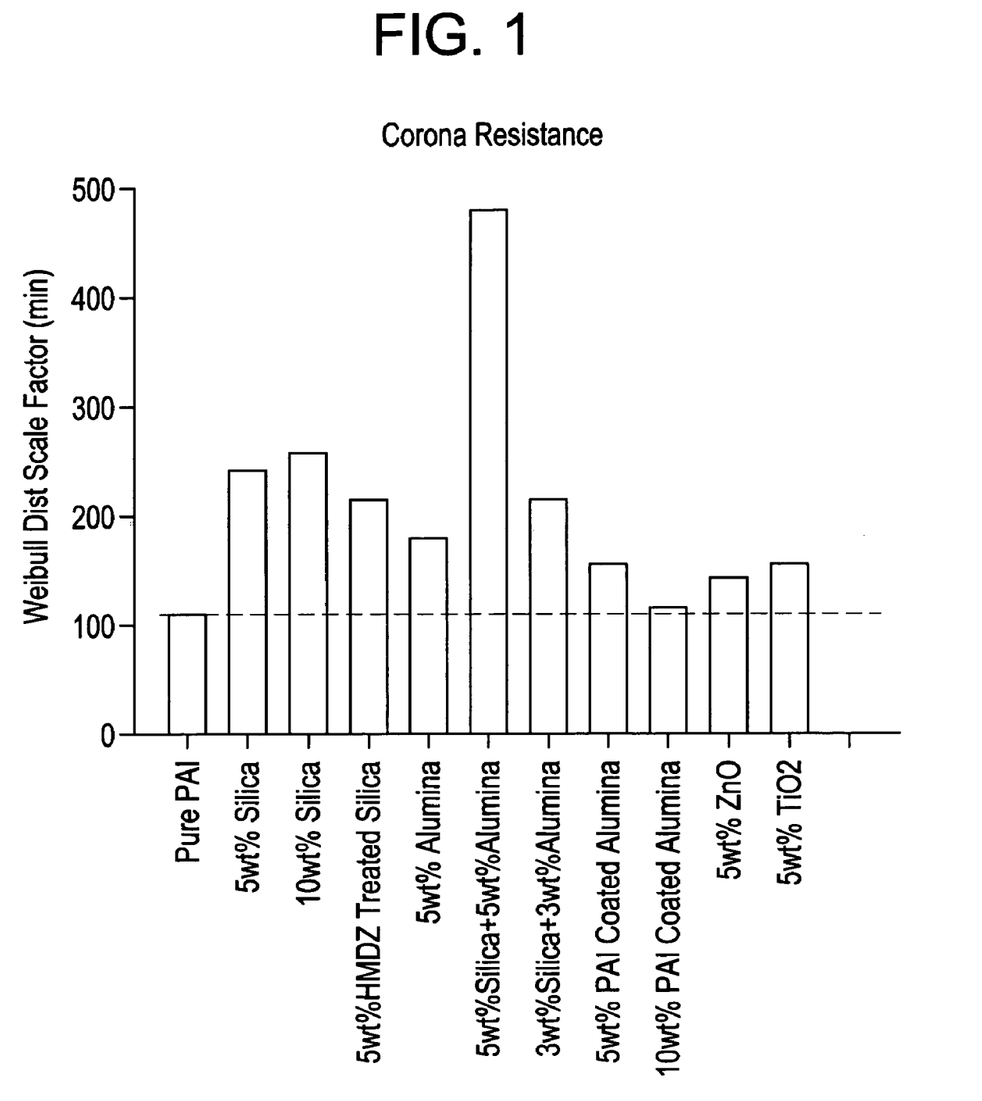
FIG. 1 represents a bar graph of the time to failure in minutes for polyamideimide (PAI) films containing various fillers subjected to the corona discharge.
Figure 2:
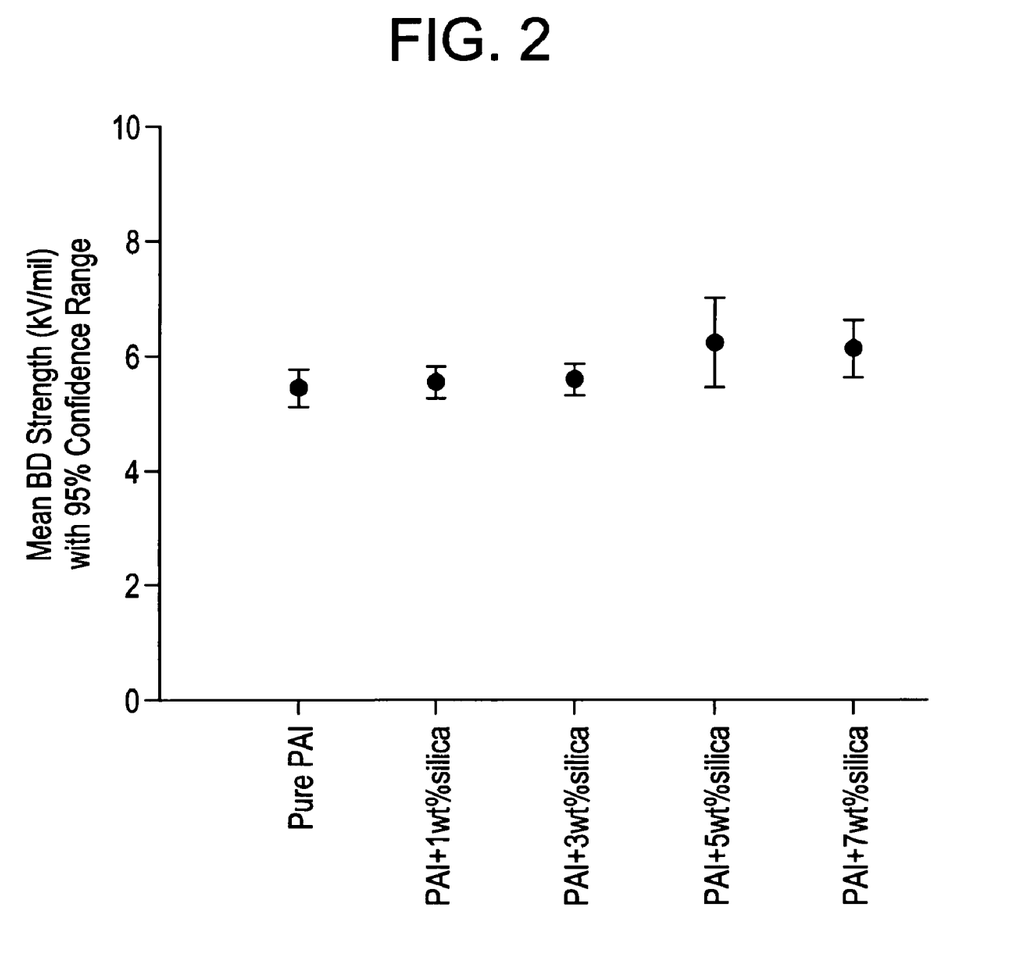
FIG. 2 represents a graph showing the breakdown voltages for polyamideimide films having different levels of fumed silica.
Figure 3:
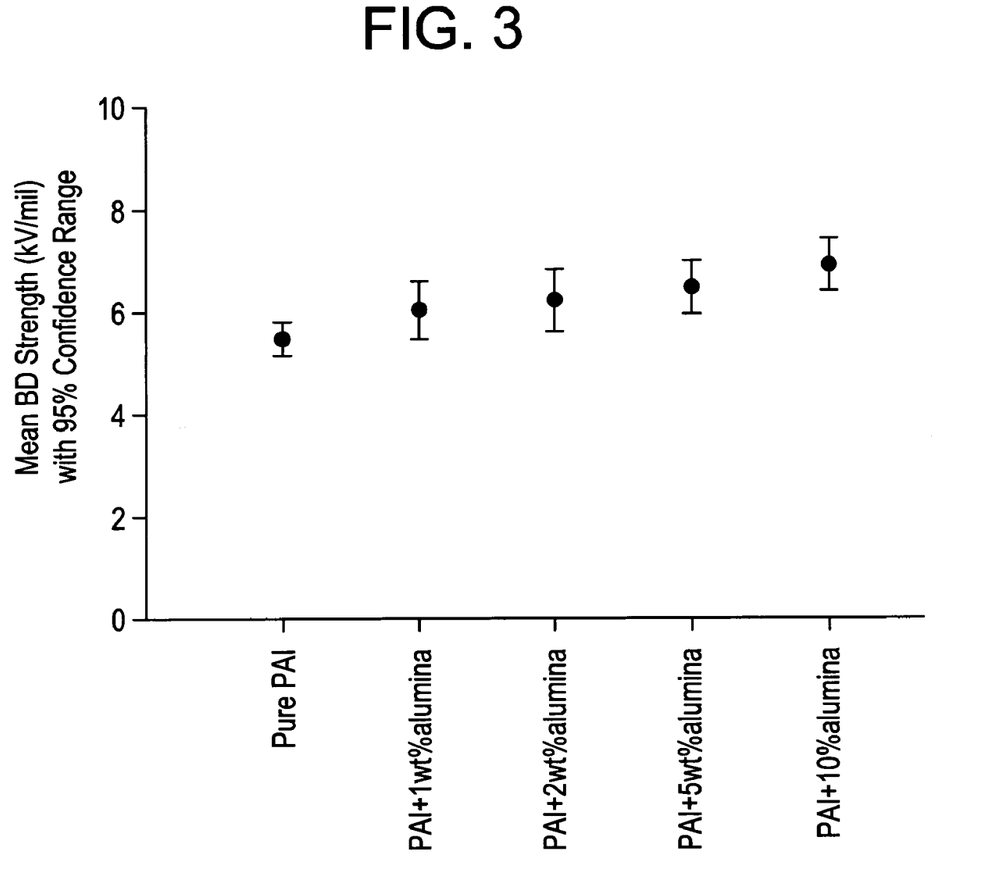
FIG. 3 represents a graph showing the breakdown voltages for polyamideimide films having different levels of fumed alumina.
Figure 4:
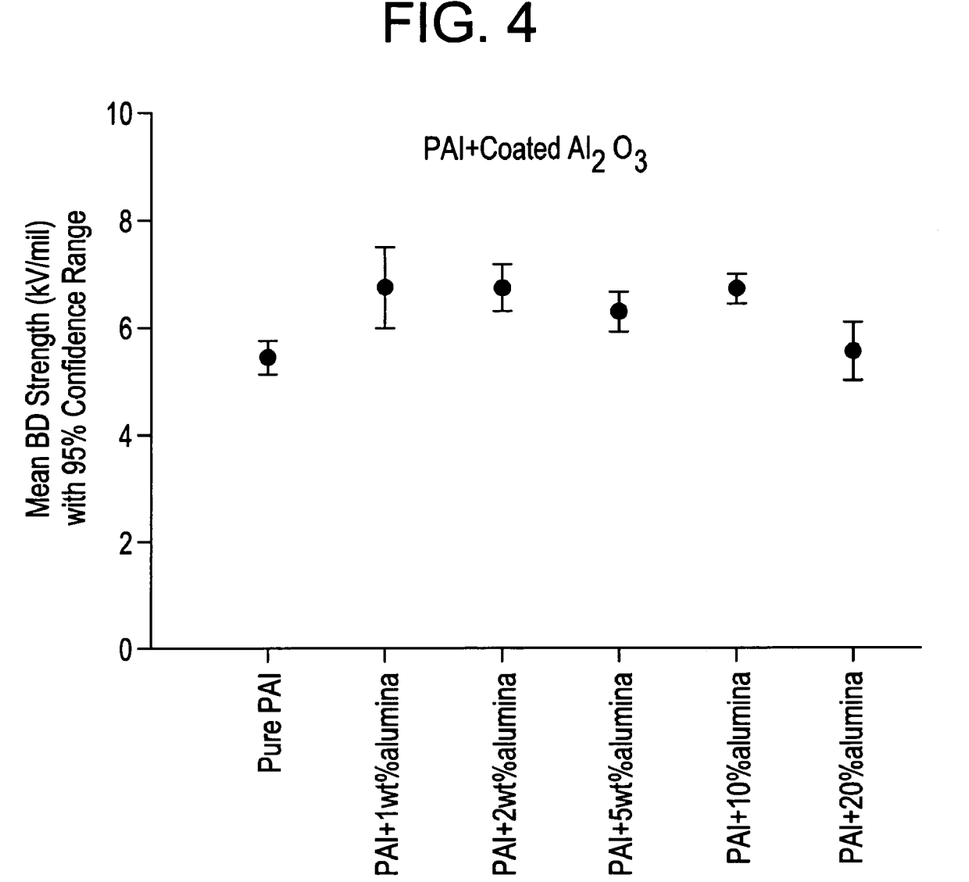
FIG. 4 represents a graph showing the breakdown voltage for polyamideimide films having different levels of fumed alumina coated with polyamideimide.
Figure 5:
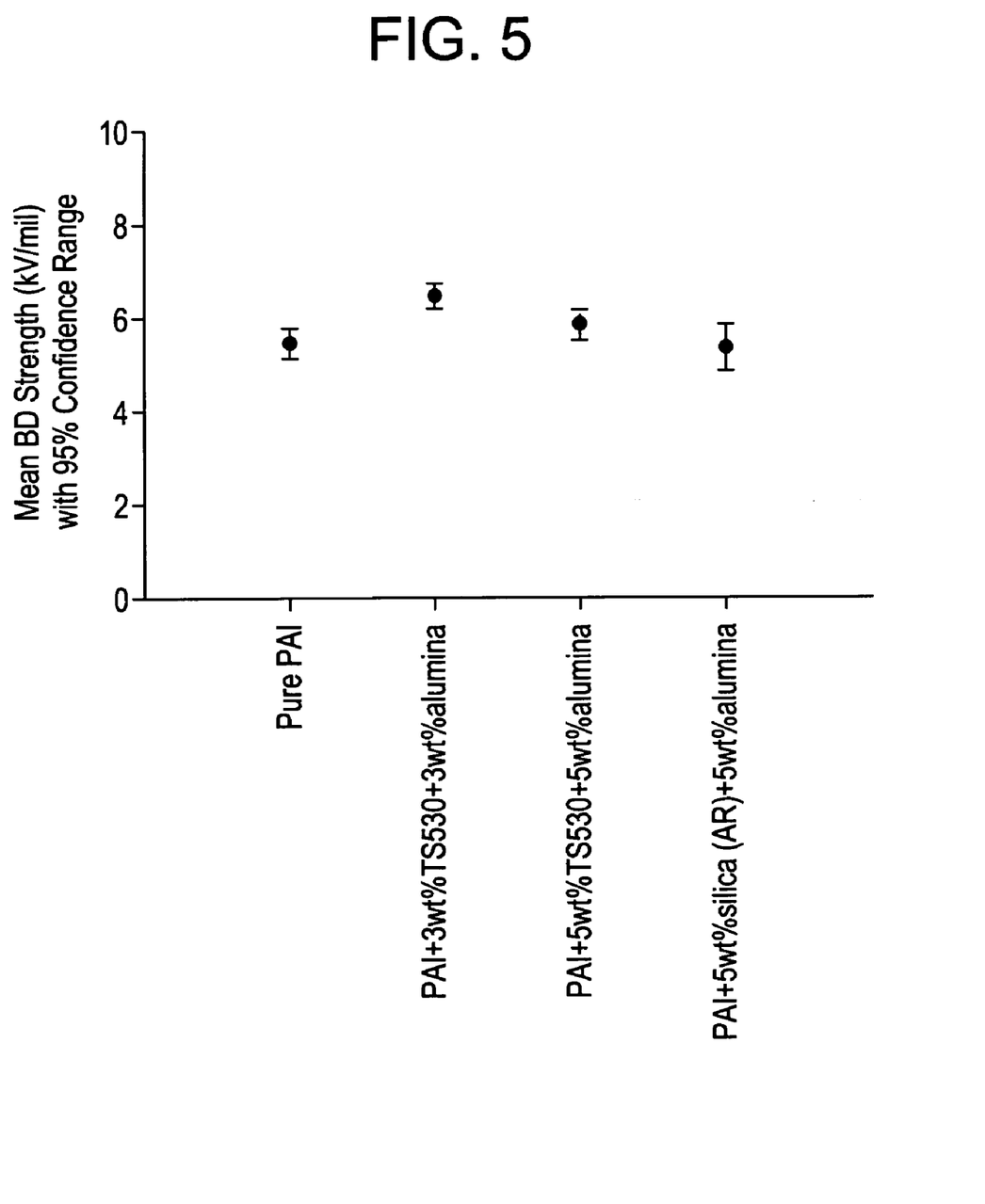
FIG. 5 represents a graph showing the breakdown voltage for polyamideimide films having different levels of fumed alumina and fumed silica.

The results are shown in FIG. 1. FIG. 1 represents a bar graph of the time to failure in minutes for the different compositions subjected to the corona discharge. The period of time to failure is indicated in the form of a Weibull Distribution Scale factor. In the figures for this example, TS530 is a commercial product that is HMDZ treated silica and AR indicates "as received" condition without further surface modification. From the figure it may be seen that all the compositions having the nanosized fillers display a corona resistance for a time period of greater than 100 minutes. The comparative composition having only the polyamideimide without any nanosized fillers clearly shows a lower resistance to corona discharge. The figure also clearly indicates that the fillers, which were surface treated with HMDZ or polyamideimide produced a greater corona resistance. An improved corona resistance was also seen for films having a combination of fillers.

Breakdown strength was also measured for the aforementioned films having different levels of some of the fillers shown in Table 3. FIGS. 2, 3, 4 and 5 show the breakdown voltages for polyamideimide films having different levels of fumed silica, filmed alumina, fumed alumina coated with polyamideimide and blends of fumed alumina and fumed silica respectively. The breakdown tests were conducted as in Example 1. The results clearly show that in all cases the addition of the nanosized fillers results in a breakdown voltage that is greater than the breakdown voltage of the polyamideimide film (the comparative composition) without the fillers.

Figure 6:
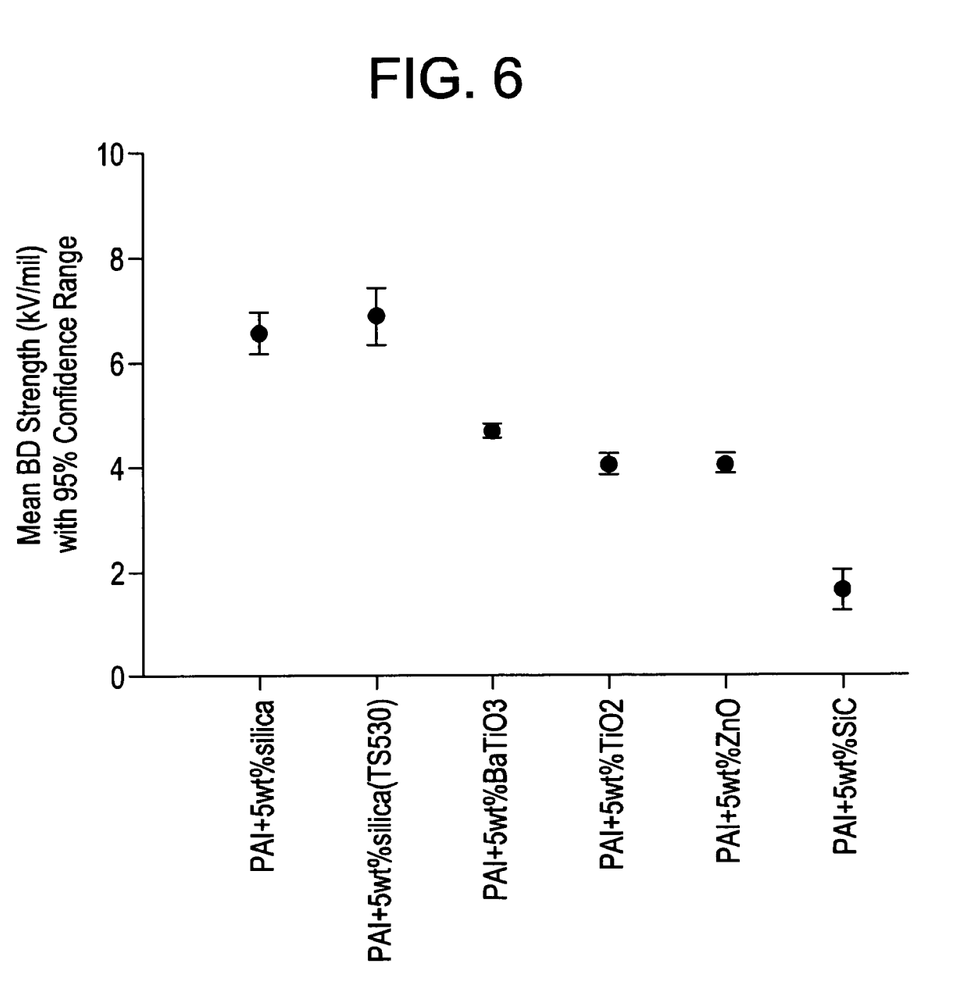
FIG. 6 represents a graph showing the breakdown voltage for polyamideimide films containing fillers having different dielectric constants.

The experiment whose results are shown in FIG. 6 was undertaken to show that fillers having a high dielectric constant resulted in lower breakdown voltage for the insulating layer than fillers, which have a low dielectric constant. From the FIG. 6, it may be seen that the high dielectric constant fillers such as barium titanate, titanium dioxide, zinc oxide, and silicon carbide produce a lower breakdown voltage than those fillers such as fumed alumina and fumed silica that have low dielectric constants.

Figure 7:
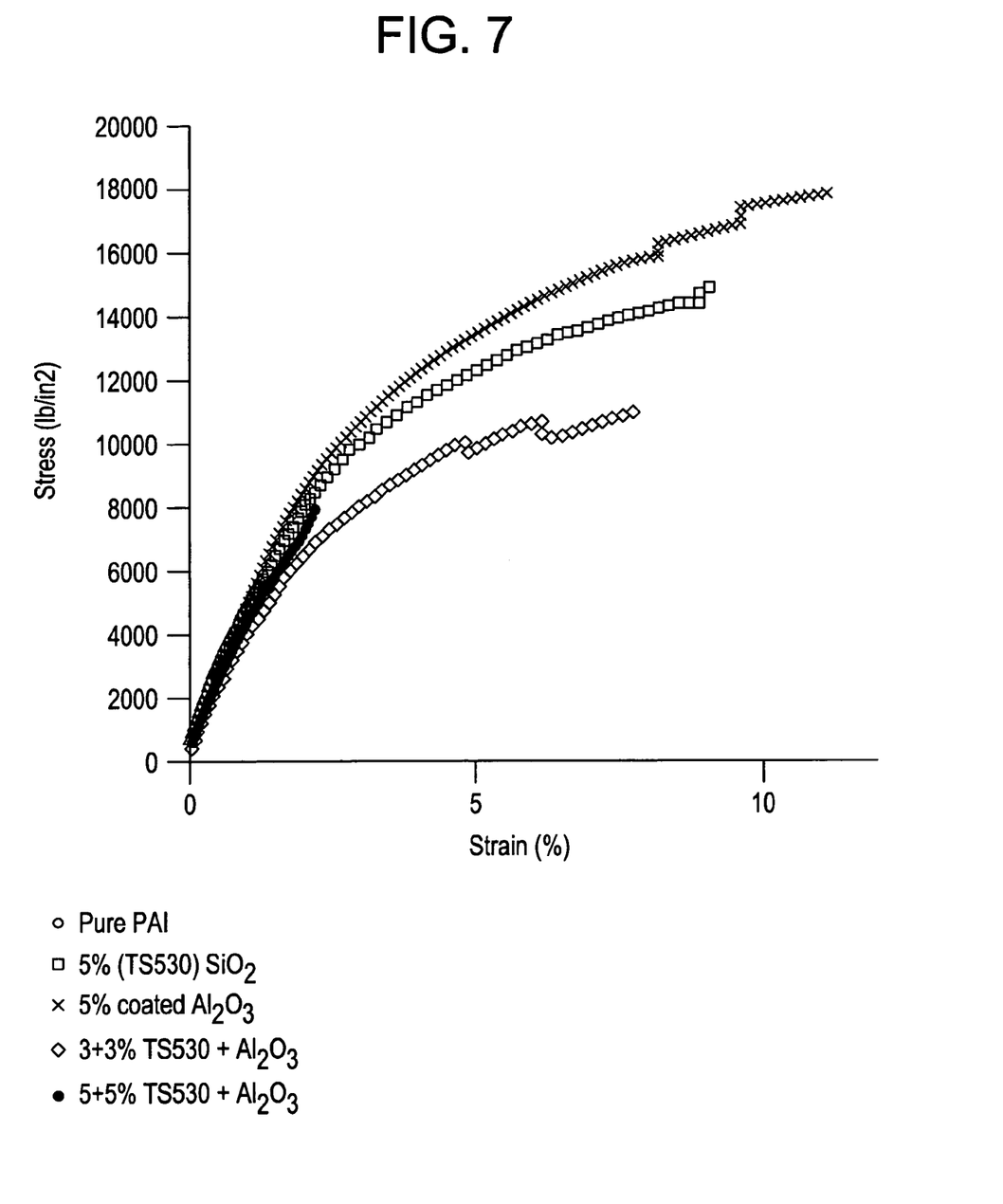
FIG. 7 is a graph of stress versus strain comparing the polyamide films containing fillers with a comparative film that does not contains fillers.

FIG. 7 shows a plot of stress versus strain for the various polyamide films containing the nanosized filler. From the figure it may be seen that the films containing the nanosized fillers were more ductile than the films containing only the polyamideimide without the nanosized fillers.

Thus quite clearly, insulating layer containing the nanosized fillers have advantages over materials that do not contain the nanosized fillers. In general, an insulating layer containing the nanosized filler displays a corona resistance that is at least 10% greater than an insulating layer that contains no nanosized filler. In one embodiment, an insulating layer containing the nanosized filler displays a corona resistance that is at least 20% greater than an insulating layer that contains no nanosized filler.

The nanosized filled insulating layers also display a breakdown voltage that is advantageously greater than insulating layers that do not contain any nanosized fillers. In one embodiment, the nanosized filled insulating layers also display a breakdown voltage that is advantageously greater than insulating layers that contain micrometer-sized fillers. From the above experiments, it may be seen that an insulating layer containing nanosized fillers (having thicknesses of about 25 to about 300 micrometers), generally display breakdown strength of greater than or equal to about 4 kilovolts, preferably greater than or equal to about 5 kilovolts, and more preferably greater than or equal to about 6 kilovolts.

Additionally, from the above experiments it may be seen that an insulating layer containing the nanosized fillers generally has a elongation at breakage that is at least 20% greater, preferably at least 40% greater, and more preferably at least 80% greater than an insulating layer containing the same thermosetting polymer, but not containing the nanosized filler.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An article comprising:
    an electrical component, the electrical component being an electrical conduction winding, stator bar, or a stator piece; and
    an electrically insulating layer disposed upon the electrical component, wherein the electrically insulating layer comprises a thermosetting polymer and a nanosized filler;
    wherein the thermosetting polymer comprises polyurethanes, phenolics, silicones, polycarbonates, polystyrenes, polyesters, polyarylates, polyarylsulfones, polyethersulfones, polyphenylene sulfides, polysulfones, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, or combinations comprising at least one of the foregoing thermosetting polymers;
    wherein the nanosized filler consists essentially of particles having the formula (II)

$(MeO)_x \cdot (Fe_2O_3)_{100-x}$       (II)

where MeO is any divalent ferrite forming metal oxide or a combination comprising two or more divalent metal oxides, and "x" is less than 50 mole percent, wherein the nanosized filler has an average largest dimension of less than or equal to about 200 nanometers, and wherein the nanosized filler particles are used in an amount of about 2 to about 15 wt % based on the total weight of the insulating layer; and
    wherein the electrically insulating layer has a thickness of about 25 to about 300 micrometers and an electrical breakdown strength of greater than or equal to about 0.75 kilovolt.

2. The article of claim 1, wherein the electrical component comprises copper.

3. The article of claim 1, wherein the thermosetting polymers are homopolymers, copolymers, ionomers, dendrimers, or a combination comprising at least one of the foregoing polymers.

4. The article of claim 1, wherein the thermosetting polymer optionally further comprises epoxies, polyacrylics, polyamides, polyamideimides, polyimides, polyetherimides, polypyromellitimides, or combinations comprising at least one of the foregoing thermosetting polymers.

5. The article of claim 1, wherein the thermosetting polymer has the structure (I)

wherein $R_1$, $R_2$, $R_3$, $R_4$, $R_5$ and $R_6$ are the same or different and wherein at least one of $R_1$, $R_2$, $R_3$, $R_4$, $R_5$ and $R_6$ is a reactive functionality prior to cross linking; m and n can be any integer including 0, with the exception that both m and n cannot both be 0 at the same time.

6. The article of claim 5, wherein the sum of m and n is about 1 to about 50,000.

7. The article of claim 5, wherein $R_1$, $R_2$, $R_3$, $R_4$, $R_5$ and/or $R_6$ are alkyl, aryl, aralkyl, fluoroalkyl, vinylalkyl, aminoalkyl, vinyl, epoxy, hydride, silanol, amine, carbinol, methacrylate, acrylate, mercapto, haloalkyl, halogen, carboxylate, acetoxy, alkoxy, or a combination comprising at least one of the foregoing functional groups.

8. The article of claim 5, wherein the thermosetting polymer has a number average molecular weight of about 75 to about 500,000 g/mole prior to crosslinking.

9. The article of claim 5, wherein the thermosetting polymer is further mixed with a silane.

10. The article of claim 9, wherein the silane is a chlorosilane, vinylsilane, vinylalkoxysilane, alkylacetoxysilane or a combination comprising at least one of the foregoing silanes.

11. The article of claim 1, wherein the insulating layer comprises a thermosetting polymer in an amount of about 50 to about 98 wt %, based on the total weight of the insulating layer.

12. The article of claim 1, wherein the nanosized filler is in the form of spheres, flakes, fibers, whiskers, or a combination comprising at least one of the foregoing forms.

13. The article of claim 1, wherein Me represents a metal, and wherein the metals are iron, manganese, nickel, copper, zinc, cobalt, magnesium, calcium, or a combination comprising at least one of the foregoing metals.

14. The article of claim 1, wherein the nanosized filler has the formula $Ni_{0.5}Zn_{0.5}Fe_2O_4$.

15. The article of claim 1, wherein the insulating layer has an electrical breakdown strength of greater than or equal to about 1 kilovolt and is corona resistant to an applied voltage of 5000 Volts at a frequency of 3 kilohertz for a time period of greater than 100 minutes.

16. The article of claim 1, wherein the insulating layer has an electrical breakdown strength of greater than or equal to the breakdown strength of the thermosetting polymer.

17. The article of claim 1, wherein the nanosized filler has an average largest dimension of less than or equal to about 75 nm.

18. An article comprising:
an electrical component, the electrical component being an electrical conduction winding, stator bar, or a stator piece; and
an electrically insulating layer disposed upon the electrical component, wherein the electrically insulating layer comprises a thermosetting polymer and a nanosized filler having an average largest dimension of less than or equal to about 75 nanometers;
wherein the thermosetting polymer comprises polyurethanes, silicones, polycarbonates, polystyrenes, polyarylates, polyarylsulfones, polyethersulfones, polyphenylene sulfides, polysulfones, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, or combinations comprising at least one of the foregoing thermosetting polymers;
wherein the nanosized filler comprises a mineral filler comprising mica, wherein the mica comprises phlogopite $(KMg_3AlSi_3O_{10}(OH)_2)$ or muscovite $(K_2Al_4[Si_6Al_2O_{20}](OH, F)_4)$;
wherein the nanosized filler is used in an amount of 0.01 to 30 wt % based on the total weight of the insulating layer; and
wherein the electrically insulating layer has a thickness of about 25 to about 300 micrometers and an electrical breakdown strength of greater than or equal to about 0.75 kilovolt.

19. An article comprising:
an electrical component, the electrical component being an electrical conduction winding, stator bar, or a stator piece; and
an electrically insulating layer disposed upon the electrical component, wherein the electrically insulating layer comprises a thermosetting polymer, and a nanosized filler having an average largest dimension of less than or equal to about 75 nanometers;
wherein the nanosized filler comprises nanosized metal oxide having the formula $Ni_{0.5}Zn_{0.5}Fe_2O_4$;
wherein the thermosetting polymer comprises polyurethanes, silicones, polycarbonates, polystyrenes, polyarylates, polyarylsulfones, polyethersulfones, polyphenylene sulfides, polysulfones, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, or combinations comprising at least one of the foregoing thermosetting polymers;

wherein the nanosized filler is used in an amount of 0.01 to 30 wt % based on the total weight of the insulating layer, and wherein the electrically insulating layer has a thickness of about 25 to about 300 micrometers and an electrical breakdown strength of greater than or equal to about 0.75 kilovolt.

20. A method of manufacturing an article comprising:

disposing an electrically insulating layer upon an electrical component, wherein the electrically insulating layer comprises a thermosetting polymer comprising polyurethanes, phenolics, silicones, polycarbonates, polystyrenes, polyesters, polyarylates, polyarylsulfones, polyethersulfones, polyphenylene sulfides, polysulfones, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfonamides, polyureas, polyphosphazenes, polysilazanes, or combinations comprising at least one of the foregoing thermosetting polymers, and a nanosized filler;

wherein the nano sized filler consists essentially of particles having the formula (II)

$$(MeO)_x \cdot (Fe_2O_3)_{100-x} \quad (II)$$

where MeO is any divalent ferrite forming metal oxide or a combination comprising two or more divalent metal oxides, and "x" is less than 50 mole percent, wherein the nanosized filler has an average largest dimension of less than or equal to about 200 nanometers, and wherein the nanosized filler particles are used in an amount of about 2 to about 15 wt % based on the total weight of the insulating layer; and curing the thermosetting polymer, wherein the electrical component is an electrical conduction winding, stator bar, or a stator piece, and wherein the electrically insulating layer has a thickness of about 25 to about 300 micrometers and an electrical breakdown strength of greater than or equal to about 0.75 kilovolt.

21. The method of claim 20, wherein the insulating layer is disposed upon the electrical component by dip coating, spray painting, electrostatic painting, brush painting, spin coating or a combination comprising at least one of the foregoing methods.

22. The method of claim 20, wherein the curing of the thermosetting polymer is conducted at a temperature of about 100 to about 250° C.

23. An article manufactured by the method of claim 20.

* * * * *

UNITED STATES PATENT AND TRADEMARK OFFICE
CERTIFICATE OF CORRECTION

PATENT NO. : 7,803,457 B2
APPLICATION NO. : 10/747725
DATED : September 28, 2010
INVENTOR(S) : Irwin et al.

It is certified that error appears in the above-identified patent and that said Letters Patent is hereby corrected as shown below:

In Column 8, Line 17, delete "mm." and insert -- nm. --, therefor.

In Column 11, Line 28, delete "and the" and insert -- and the like. The --, therefor.

In Column 13, Line 25, delete "filmed" and insert -- fumed --, therefor.

In Column 18, Line 5, in Claim 20, delete "nano sized" and insert -- nanosized --, therefor.

Signed and Sealed this

Twenty-third Day of November, 2010

David J. Kappos
*Director of the United States Patent and Trademark Office*